United States Patent
Meng (10) Patent No.: US 12,066,727 B2
(45) Date of Patent: Aug. 20, 2024

(54) DISPLAY PANEL AND DISPLAY DEVICE

(71) Applicant: GUANGZHOU CHINA STAR OPTOELECTRONICS SEMICONDUCTOR DISPLAY TECHNOLOGY CO., LTD., Guangzhou (CN)

(72) Inventor: Yanhong Meng, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/088,969

(22) Filed: Dec. 27, 2022

(65) Prior Publication Data

US 2024/0134237 A1 Apr. 25, 2024
US 2024/0231164 A9 Jul. 11, 2024

(30) Foreign Application Priority Data

Oct. 21, 2022 (CN) .......................... 202211291610.2

(51) Int. Cl.
*G02F 1/1333* (2006.01)
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC ............. G02F 1/136286; G02F 1/1368; G02F 1/136259; G02F 1/136263; G02F 1/133345; H01L 27/1244
See application file for complete search history.

(56) References Cited

U.S. PATENT DOCUMENTS 6,429,909 B1 * 8/2002 Kim ...................... G02F 1/1309
 349/143
2001/0035920 A1 * 11/2001 Choi ...................... G02F 1/1362
 349/139

(Continued)

FOREIGN PATENT DOCUMENTS

CN 104793420 A 7/2015
CN 106681036 A 5/2017

(Continued)

OTHER PUBLICATIONS

Chinese Office Action issued in corresponding Chinese Patent Application No. 202211291610.2 dated Nov. 30, 2022, pp. 1-9, 21pp.

*Primary Examiner* — Hoan C Nguyen
(74) *Attorney, Agent, or Firm* — The Roy Gross Law Firm, LLC; Roy Gross (57) ABSTRACT

The present application discloses a display panel and a display device. A first metal layer includes at least one first signal transmitting portion. An insulating layer includes a protrusion portion covering the first signal transmitting portion. A second metal layer includes at least one second signal transmitting portion. The second signal transmitting portion includes a first sub-portion, a second sub-portion, and a third sub-portion. The second sub-portion and the third sub-portion are respectively connected to two ends of the first sub-portion. A conductive layer includes a bridging portion. An orthographic projection of the second sub-portion on a substrate and an orthographic projection of the third sub-portion on the substrate both fall outside a coverage of an orthographic projection of the protrusion portion on the substrate. Two ends of the bridging portion are electrically connected to the second sub-portion and the third sub-portion respectively.

14 Claims, 8 Drawing Sheets

(56) References Cited

U.S. PATENT DOCUMENTS

| | | | | |
|---|---|---|---|---|
| 2004/0169781 | A1* | 9/2004 | Lee | G02F 1/136259 |
| | | | | 349/54 |
| 2007/0184587 | A1* | 8/2007 | You | H01L 27/124 |
| | | | | 438/149 |
| 2007/0285594 | A1* | 12/2007 | Kang | G02F 1/136259 |
| | | | | 349/54 |
| 2007/0296901 | A1* | 12/2007 | Seo | G02F 1/134363 |
| | | | | 349/141 |
| 2007/0298631 | A1* | 12/2007 | Li | G02F 1/136259 |
| | | | | 439/94 |
| 2017/0052419 | A1* | 2/2017 | Lin | G02F 1/136259 |
| 2019/0148474 | A1 | 5/2019 | Bu | |
| 2020/0393924 | A1 | 12/2020 | Li et al. | |

FOREIGN PATENT DOCUMENTS

| | | | | |
|---|---|---|---|---|
| CN | 110928091 | A | | 3/2020 |
| CN | 111952246 | A | | 11/2020 |
| CN | 212433551 | U | | 1/2021 |
| CN | 113257738 | A | | 8/2021 |
| KR | 100309922 | B1 | * | 10/2002 |
| KR | 20030057696 | A | * | 7/2003 |
| WO | 2016090659 | A1 | | 6/2016 |

\* cited by examiner

DISPLAY PANEL AND DISPLAY DEVICE

CROSS REFERENCE TO RELATED APPLICATIONS

This application claims the benefit of priority of Chinese Application No. 202211291610.2 filed on Oct. 21, 2022. The contents of the above applications are all incorporated by reference as if fully set forth herein in their entirety.

FIELD OF INVENTION

The present application relates to a field of display technology, in particular, to a display panel and a display device.

DESCRIPTION OF PRIOR ART

At present, an array substrate of a display panel is usually provided with a plurality of insulating layers and metal layers. The metal layers can be applied to form thin-film transistors or signal lines to realize display of the display panel, and the insulating layers can be applied to space different layers or metal layers with different signals transmitting.

For example, in the array substrate, a gate electrode insulating layer can be disposed between a metal layer and a gate electrode for spacing insulation. However, the gate electrode insulating layer will form a slope at a position where the gate electrode insulating layer covers the gate electrode. Then the metal layer will also form a ramp at a position where the metal layer overlaps with the gate electrode. The gate electrode insulating layer contacted to the metal layer is usually a silicon oxide layer, and an adhesion between the silicon oxide layer and the metal layer is small, resulting in a peeling off phenomenon between the metal layer and the silicon oxide layer at the ramp. Therefore, an etching solution penetrates and overetchs the metal layer when etching the metal layer is performed. This leads to a disconnection of the metal layer.

SUMMARY

Embodiments of the present application provide a display panel and a display device, which can improve a phenomenon that signal transmission is interrupted due to a breakage of a first signal transmitting portion and improve a yield of the display panel.

The embodiments of the present application provide a display panel, including:
  a substrate;
  a first metal layer disposed on the substrate and including at least one first signal transmitting portion;
  an insulating layer covering the substrate and the first metal layer and including a protrusion portion covering the first signal transmitting portion;
  a second metal layer disposed on a surface of the insulating layer away from the first metal layer, wherein the second metal layer includes at least one second signal transmitting portion, the second signal transmitting portion includes a first sub-portion disposed on a side of the protrusion portion away from the first signal transmitting portion, a second sub-portion, and a third sub-portion, wherein the second sub-portion and the third sub-portion are respectively connected to two ends of the first sub-portion; and
  a conductive layer disposed on a side of the second metal layer away from the insulating layer and including a bridging portion disposed on a side of the second signal transmitting portion away from the first signal transmitting portion,
  wherein an orthographic projection of the second sub-portion on the substrate and an orthographic projection of the third sub-portion on the substrate both fall outside a coverage of an orthographic projection of the protrusion portion on the substrate, and two ends of the bridging portion are electrically connected to the second sub-portion and the third sub-portion respectively.

In one embodiment of the present application, the display panel further includes a plurality of thin-film transistors disposed on the substrate and a data line electrically connected to each of the thin-film transistors, each of the thin-film transistors includes a gate electrode, an active portion, and a source electrode and a drain electrode lap-jointed with the active portion; and
  wherein the first signal transmitting portion includes the gate electrode, the first sub-portion includes the source electrode, the second sub-portion and the third sub-portion both include the data line, the source electrode is located on a side of the protrusion portion away from the gate electrode, the data line is connected to two ends of the source electrode, an orthographic projection of the data line on the substrate falls outside the coverage of the orthographic projection of the protrusion portion on the substrate, and the two ends of the bridging portion are both electrically connected to the data line.

In one embodiment of the present application, the display panel further includes a first wire, a second wire, a third wire, and a fourth wire disposed in a non-display area of the display panel; and
  the first signal transmitting portion comprises the fourth wire, the first sub-portion comprises the first wire, the second sub-portion comprises the second wire, the third sub-portion comprises the third wire, the first wire is located on a side of the protrusion portion away from the fourth wire, the second wire and the third wire are connected to two ends of the first wire respectively, and the two ends of the bridging portion are connected to the second wire and the third wire respectively.

In one embodiment of the present application, the display panel further includes at least one interlayer dielectric layer disposed between the second metal layer and the conductive layer, a first contact hole and a second contact hole are defined through the at least one interlayer dielectric layer, the bridging portion connects with the second sub-portion through the first contact hole, and the bridging portion connects with the third sub-portion through the second contact hole; and
  wherein an orthographic projection of the first contact hole on the substrate and an orthographic projection of the second contact hole on the substrate both fall outside the coverage of the orthographic projection of the protrusion portion on the substrate.

In one embodiment of the present application, the display panel further includes a pixel electrode disposed on a side of the conductive layer away from the at least one interlayer dielectric layer, the conductive layer further includes a common electrode, and the common electrode is spaced from the bridging portion.

In one embodiment of the present application, at least two interlayer dielectric layers are disposed between the second metal layer and the conductive layer, and the display panel further includes a common electrode between any two adjacent ones of the at least two interlayer dielectric layers; and wherein the conductive layer further includes a pixel electrode, and the pixel electrode is spaced from the bridging portion.

In one embodiment of the present application, the first contact hole and the second contact hole both go through the at least two interlayer dielectric layers, and the common electrode is spaced from the bridging portion at the first contact hole and the second contact hole.

In one embodiment of the present application, the display panel further includes a common electrode layer disposed on a side of the at least one interlayer dielectric layer away from the second metal layer, and the conductive layer is disposed on a side of the common electrode layer away from the at least one interlayer dielectric layer; and wherein the conductive layer further includes at least one auxiliary electrode spaced from the bridging portion, the common electrode layer includes a spacer electrode disposed between the bridging portion and the at least one interlayer dielectric layer and a common electrode disposed between the auxiliary electrode and the at least one interlayer dielectric layer, and the spacer electrode is spaced from the common electrode.

In one embodiment of the present application, the conductive layer includes a plurality of auxiliary electrodes, the plurality of auxiliary electrodes extend along a first direction and are arranged on a side of the common electrode away from the at least one interlayer dielectric layer along a second direction, the plurality of auxiliary electrodes are electrically connected to the common electrode, and the first direction is different from the second direction.

In one embodiment of the present application, the second metal layer includes a plurality of second signal transmitting portions, the plurality of second signal transmitting portions extend along the first direction and are arranged on a side of the insulating layer away from the first metal layer along the second direction, and each of the auxiliary electrodes is correspondingly disposed on a side of one of the plurality of second signal transmitting portions away from the first metal layer.

According to the above purpose of the present application, the embodiments of the application also provides a display device, the display device includes the display panel as defined above.

In the present application, the bridging portion is provided above the second signal transmitting portion, and two ends of the bridging portion are electrically connected to the second sub-portion and the third sub-portion respectively. So that the bridging portion and the first sub-portion are connected in parallel, wherein the second sub-portion and the third sub-portion both overlap with the protrusion portion. Therefore, even when the first sub-portion breaks at a side wall of the protrusion portion, the signal can be transmitted through the bridging portion without interrupting the signal transmission. This improves a phenomenon of signal transmission interruption due to a disconnection of the second signal transmitting portion, and improves a yield and stability of the display panel. In addition, the present application provides the bridging portion in parallel with the second signal transmitting portion. This can reduce a resistance value of the second signal transmitting portion, improve current transmission efficiency of the second signal transmitting portion, and improve display effect of the display panel.

DETAILED DESCRIPTION OF EMBODIMENTS

In the following, the technical scheme in the embodiments of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

Figure 1:
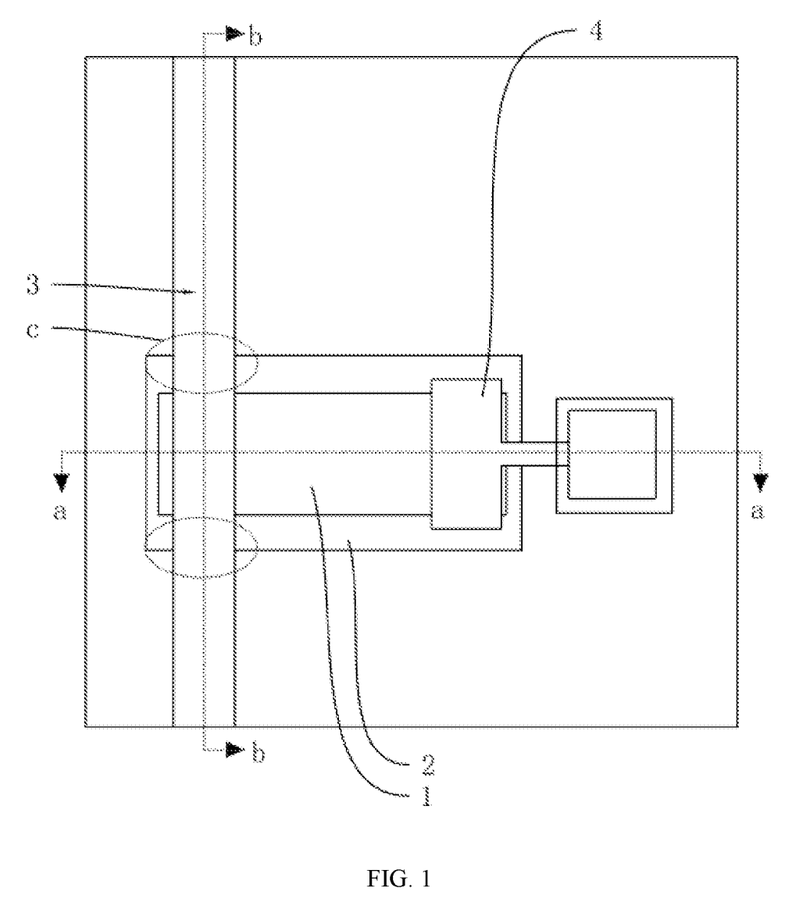
FIG. 1 is a schematic structural diagram of a plane distribution of a display panel in related technologies.
Figure 2:
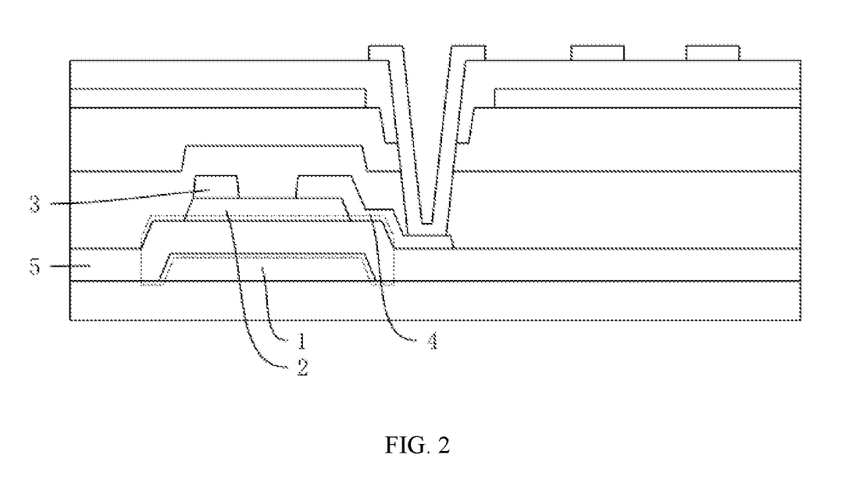
FIG. 2 is a schematic structural diagram of a cross-portion of the display panel taken along line aa in FIG. 1 in the relevant technologies.
Figure 3:
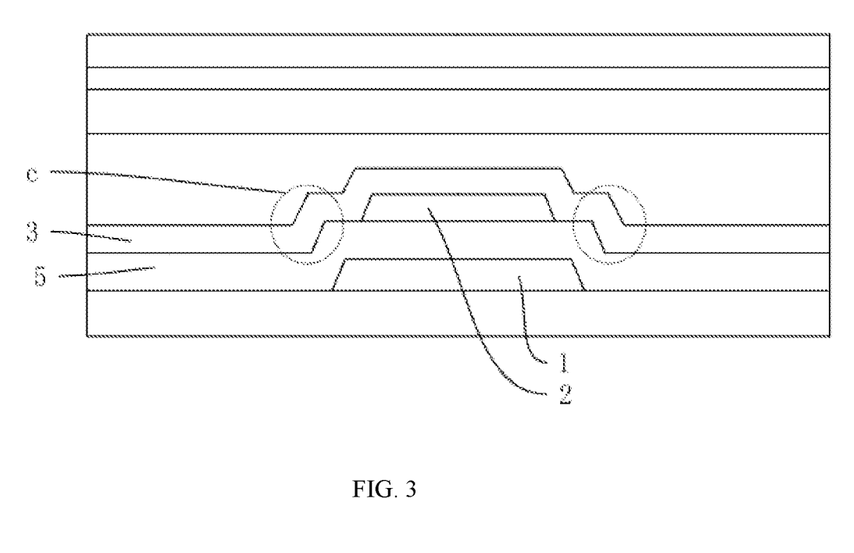
FIG. 3 is a schematic structural diagram of a cross-portion of the display panel taken along line bb in FIG. 1 in the relevant technologies.

In related technologies, please refer to FIG. 1, FIG. 2, and FIG. 3. A display panel includes a thin-film transistor disposed on a substrate. In detail, the display panel specifically includes a gate electrode 1 disposed on the substrate, a gate insulating layer 5 covering the gate electrode, an active layer 2 disposed on the gate insulating layer 5 and corresponding to the gate electrode 1, and a source electrode 3 and a drain electrode 4 disposed on two sides of the active layer 2. The display panel also includes a data line electrically connected to the source electrode 3 of the thin-film transistor. The data line is integrally formed with the source electrode 3. A slope will be formed at a position C when the gate insulating layer 5 covering the gate electrode 1, and the source electrode 3 is prone to disconnection at the slope position C. This will interrupt signal transmission of the data line, and affect a normal display function of the display panel.

Figure 4:
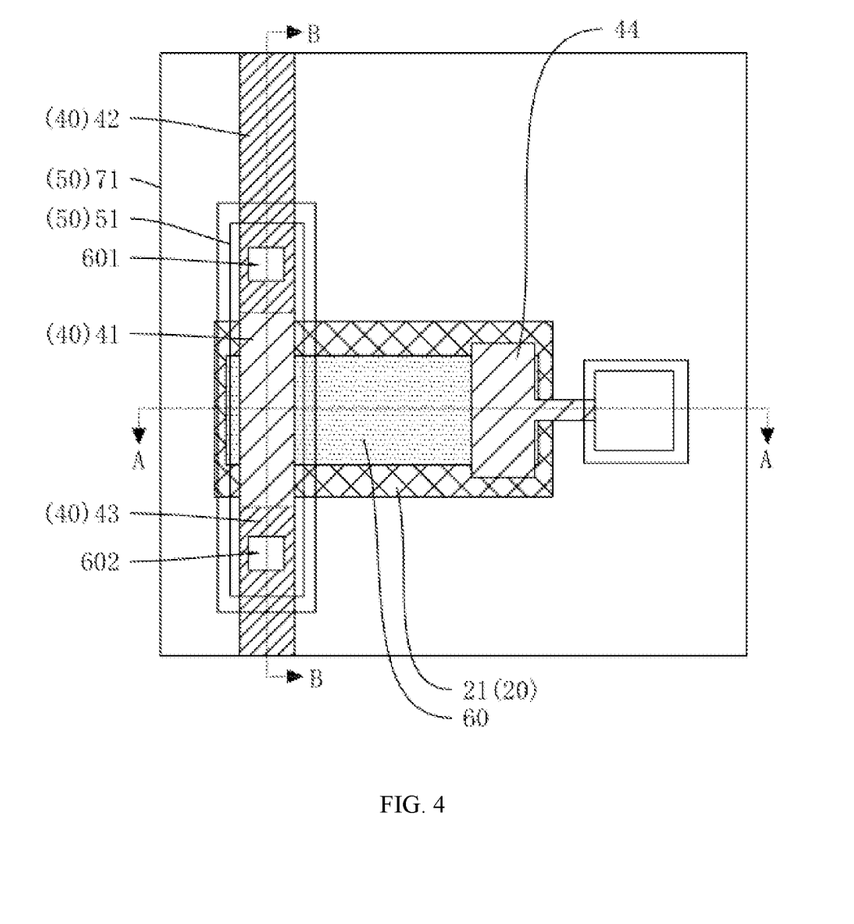
FIG. 4 is a schematic structural diagram of a plane distribution of a display panel in embodiments of the present application.
Figure 5:
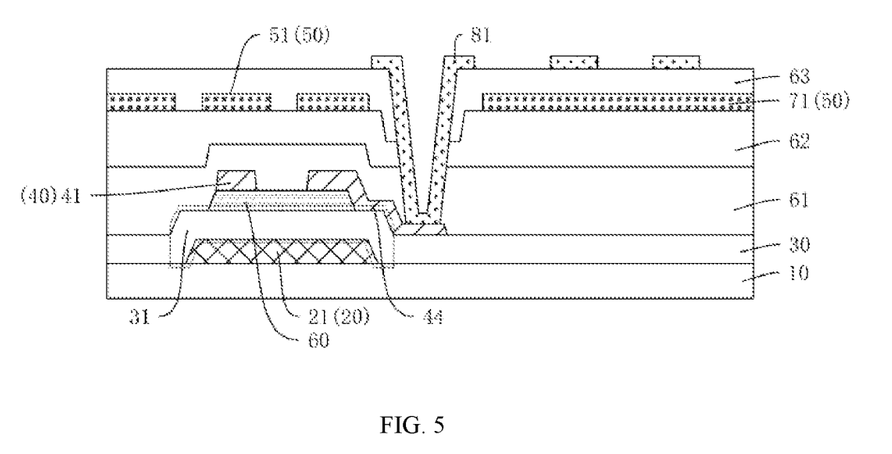
FIG. 5 is a schematic structural diagram of a cross-portion of the display panel taken along the line AA in FIG. 4 in the embodiments of the present application.
Figure 6:
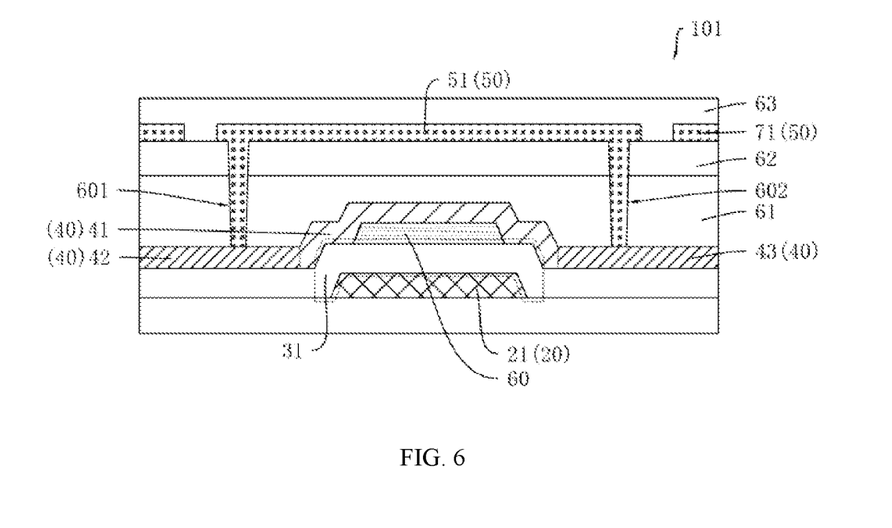
FIG. 6 is a schematic structural diagram of a cross-portion of the display panel taken along the line BB in FIG. 4 in the embodiments of the present application.

Referring to FIG. 4, FIG. 5, and FIG. 6, an embodiment of the present application provides a display panel including a substrate 10, a first metal layer, an insulating layer 30, a second metal layer, and a conductive layer 50.

The first metal layer is disposed on the substrate 10 and includes at least one first signal transmitting portion 20. The insulating layer 30 covers the substrate 10 and the first metal layer. The insulating layer 30 includes a protrusion portion 31 covering the first signal transmitting portion 20. The second metal layer is disposed on a surface of the insulating layer 30 away from the first metal layer and includes at least one second signal transmitting portion 40. The second signal transmitting portion 40 includes a first sub-portion 41 disposed on a side of the protrusion portion 31 away from the first signal transmitting portion 20, a second sub-portion 42, and a third sub-portion 43, wherein the second sub-portion 42 and the third sub-portion 43 are respectively connected to two ends of the first sub-portion 41. The conductive layer 50 is disposed on a side of the second metal layer away from the insulating layer 30 and includes a bridging portion 51 disposed on a side of the second signal transmitting portion 40 away from the first signal transmitting portion 20.

Further, an orthographic projection of the second sub-portion 42 on the substrate 10 and an orthographic projection of the third sub-portion 43 on the substrate 10 both fall outside a coverage of an orthographic projection of the protrusion portion 31 on the substrate 10. Two ends of the bridging portion 51 are electrically connected to the second sub-portion 42 and the third sub-portion 43 respectively.

In an embodiment, the second signal transmitting portion 40 includes the first sub-portion 41, the second sub-portion 42, and the third sub-portion 43. The first sub-portion 41 located on the protrusion portion 31. The second sub-portion 42 and the third sub-portion 43 are connected to the two ends of the first sub-portion 41. The second sub-portion 42 and the third sub-portion 43 do not overlap the protrusion portion 31. In the present application, the bridging portion 51 is provided above the second signal transmitting portion 40. The two ends of the bridging portion 51 are electrically connected to the second sub-portion 42 and the third sub-portion 43 respectively. So that the bridging portion 51 and the first sub-portion 41 are connected in parallel. Therefore, even when the first sub-portion 41 breaks at a side wall of the protrusion portion 31, the signal can also be transmitted through the bridging portion 51 without interrupting the signal transmission, and a yield and stability of the display panel can be improved. In addition, the present application provides the bridging portion 51 in parallel with the second signal transmitting portion 40. This can reduce a resistance value of the second signal transmitting portion 40, improve current transmission efficiency of the second signal transmitting portion 40, and improve display effect of the display panel.

In one embodiment of the present application, please continue to refer to FIG. 4, FIG. 5, FIG. 6, and FIG. 7. The display panel includes a substrate 10, a first metal layer disposed on the substrate 10, an insulating layer 30 disposed on the substrate 10 and covering the first metal layer, a semiconductor layer disposed on the insulating layer 30, a second metal layer disposed on the insulating layer 30 and the semiconductor layer, at least one interlayer dielectric layer disposed on the insulating layer 30 and covering the semiconductor layer and the second metal layer, a conductive layer 50 disposed on the interlayer dielectric layer, a third dielectric layer 63 disposed on the interlayer dielectric layer and covering the conductive layer 50, and a pixel electrode 81 disposed on the third dielectric layer 63.

The first metal layer includes a first signal transmitting portion 20 disposed on the substrate 10. The insulating layer 30 covers the substrate 10 and the first signal transmitting portion 20. The insulating layer 30 forms a protrusion portion 31 covering the first signal transmitting portion 20. It can be understood that the first signal transmitting portion 20 protrudes from a surface of the substrate 10. When the insulating layer 30 covers the first signal transmitting portion 20, the protrusion portion is formed at a position where the first signal transmitting portion 20 protrudes from the substrate 10.

The second metal layer is disposed on the semiconductor layer and the insulating layer 30. The second metal layer includes a second signal transmitting portion 40. The second signal transmitting portion 40 includes a first sub-portion 41 disposed on a side of the protrusion portion 31 away from the first signal transmitting portion 20, a second sub-portion 42, and a third sub-portion 43. The second sub-portion 42 and the third sub-portion 43 are connected to two ends of the first sub-portion 41 respectively. It should be noted that an orthographic projection of the second sub-portion 42 on the substrate 10 and an orthographic projection of the third sub-portion 43 on the substrate 10 both fall outside a coverage of an orthographic projection of the protrusion portion 31 on the substrate 10.

The at least one interlayer dielectric layer includes a first dielectric layer 61 and a second dielectric layer 62. The first dielectric layer 61 covers the second metal layer. The second dielectric layer 62 is disposed on a side of the first dielectric layer 61 away from the second metal layer. The first dielectric layer 61 may be made of inorganic insulating material. The second dielectric layer 62 may be made of organic insulating material.

The conducting layer 50 is disposed on a side of the second dielectric layer 62 away from the first dielectric layer 61. The conducting layer 50 includes a bridging portion 51 and a common electrode 71 spaced from each other. Two ends of the bridging portion 51 are electrically connected to the second sub-portion 42 and the third sub-portion 43 respectively. That is, the at least one interlayer dielectric layer is provided with a first contact hole 601 and a second contact hole 602. Both the first contact hole 601 and the second contact hole 602 go through the first dielectric layer 61 and the second dielectric layer 62. In addition, an orthographic projection of the first contact hole 601 on the substrate 10 and an orthographic projection of the second contact hole 602 on the substrate 10 both fall outside the coverage of the orthographic projection of the protruding portion 31 on the substrate 10. An end of the bridging portion 51 is connected to the second sub-portion 42 through the first contact hole 601, and another end of the bridging portion 51 is connected to the third sub-portion 43 through the second contact hole 602, so that the bridging portion 51 is connected in parallel with the first sub-portion 41. Because a slope is formed on a side wall of the protrusion portion 31, and the first sub-portion 41 of the second signal transmitting portion 40 covers the slope, the first sub-portion 41 is easy to break, thus interrupting the signal transmission of the second signal transmission portion 40. However, in the embodiments of the present application, by providing the bridging portion 51 in parallel with the first sub-portion 41, even when the first sub-portion 41 breaks on the slope, the bridging portion 51 can still realize the signal transmission of the second signal transmitting portion 40. This improves a yield and display effect of the display panel.

Further, the pixel electrode 81 is disposed on the third dielectric layer 63. The pixel electrode 81 can form an electric field in common with the common electrode 71. Furthermore, the display panel provided in the embodiments of the present application can be applied for fringe field switching (FFS) type liquid crystal displays.

In the embodiments of the present application, the display panel also includes a plurality of thin-film transistors disposed on the substrate 10 and a data line electrically connected to each of the thin-film transistors. The thin-film transistor includes a gate electrode 21, an active portion 60, a source electrode, and a drain electrode 44. The source electrode and the drain electrode 44 are lap-jointed with the active portion.

In detail, referring to FIG. 5 and FIG. 6, the display panel includes a display area 101. The plurality of thin-film transistors are disposed in the display area 101. The first signal transmitting portion 20 includes a gate electrode 21. The semiconductor layer includes an active portion 60 above the gate electrode 21. The second metal layer includes a drain electrode 44. The second signal transmitting portion 40 includes a source electrode and a data line. That is, the first sub-portion 41 can be the source electrode. The second sub-portion 42 and the third sub-portion 43 can be the data line. The source electrode and the drain electrode 44 are located on two sides of the active portion 60. The data line is connected to the two ends of the source electrode to be integrally formed with the source electrode. A protrusion portion 31 is formed when the insulating layer 30 covering the gate electrode 21. The active portion 60 is located on a surface of the protrusion portion 31 away from the gate electrode 21. The source electrode is located on a surface of the protrusion portion 31 and the active portion 60 both away from the gate electrode 21. The source electrode covers a part of side walls of the protrusion portion 31, while the data line is connected to the two ends of the source electrode. In addition, an orthographic projection of the data line on the substrate 10 is not overlapped with an orthographic projection of the protrusion portion 31 on the substrate 10. The two ends of the bridging portion 51 are respectively connected to the data line on two sides of the source electrode, so as to realize a parallel connection between the bridging portion 51 and the source electrode. This avoids a probability of interrupting the signal transmission of the data line due to fracture of the source electrode at the side wall of the protrusion portion 31 and improves the yield and the display effect of the display panel.

It should be noted that the pixel electrode 81 penetrates through the third dielectric layer 63, the second dielectric layer 62, and the first dielectric layer 61 and is lap jointed with the drain electrode 44 to realize signal transmission. The pixel electrode 81 can form an electric field with the common electrode 71. In addition, the display panel includes a plurality of data lines arranged in the display area 101. Each of the data lines is arranged in a same direction to transmit signal to every thin-film transistor. The data line is also prone to signal transmission attenuation due to a long transmission path and a resistance value. In the embodiments of the present application, the bridging portion 51 in parallel with the source can be provided to reduce the resistance value of the data line, improve the signal transmission efficiency, and improve the display effect.

Figure 7:
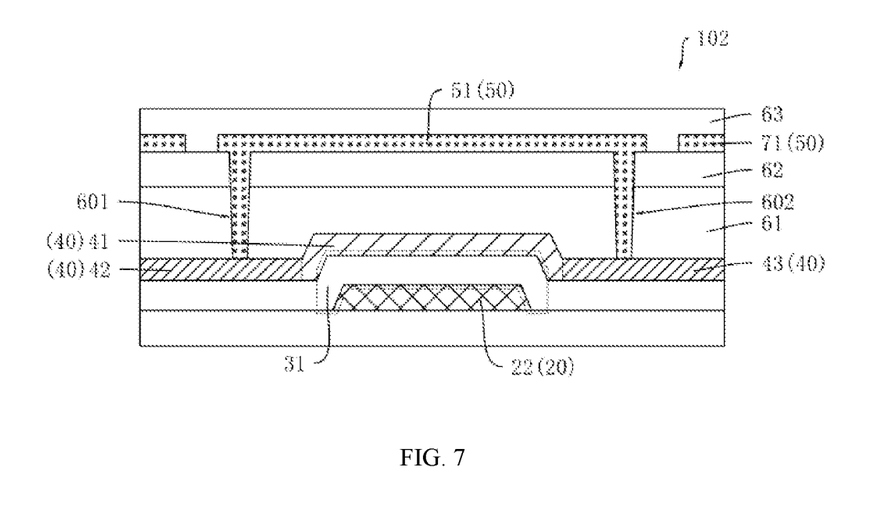
FIG. 7 is a schematic structural diagram of a cross-portion of the display panel in a non-display area in the embodiments of the present application.
Figure 8:
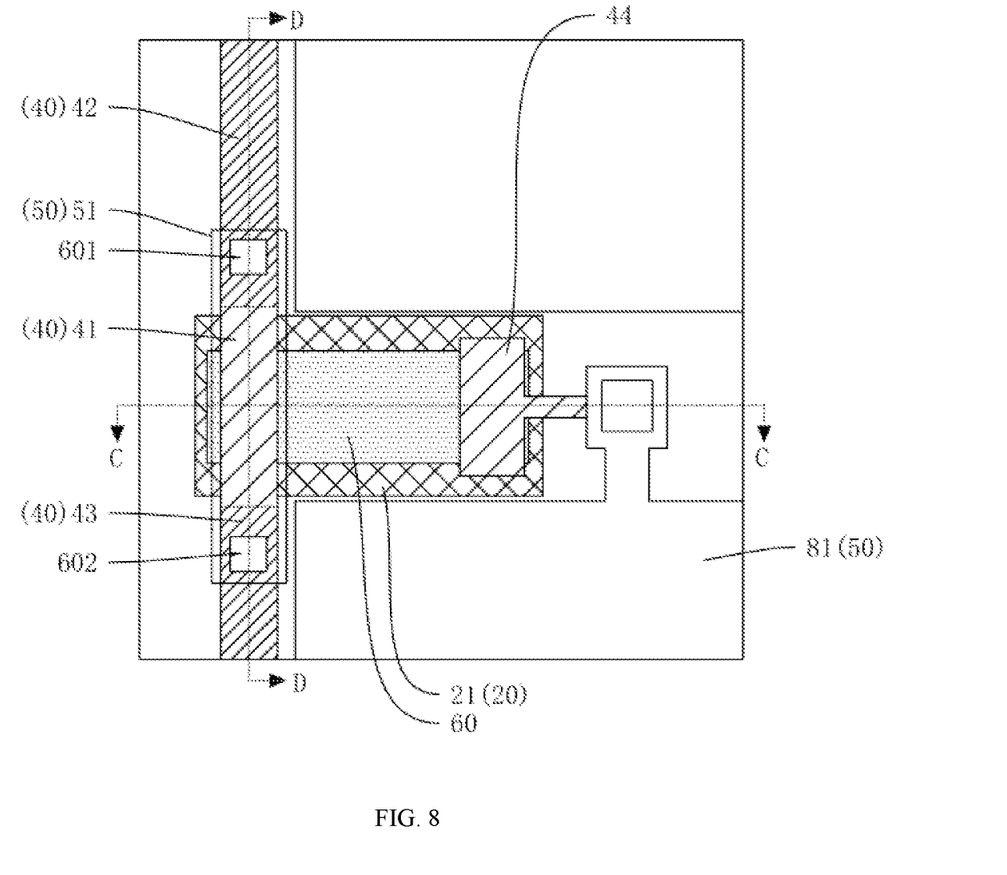
FIG. 8 is a schematic structural diagram of the display panel in the embodiments of the present application.
Figure 9:
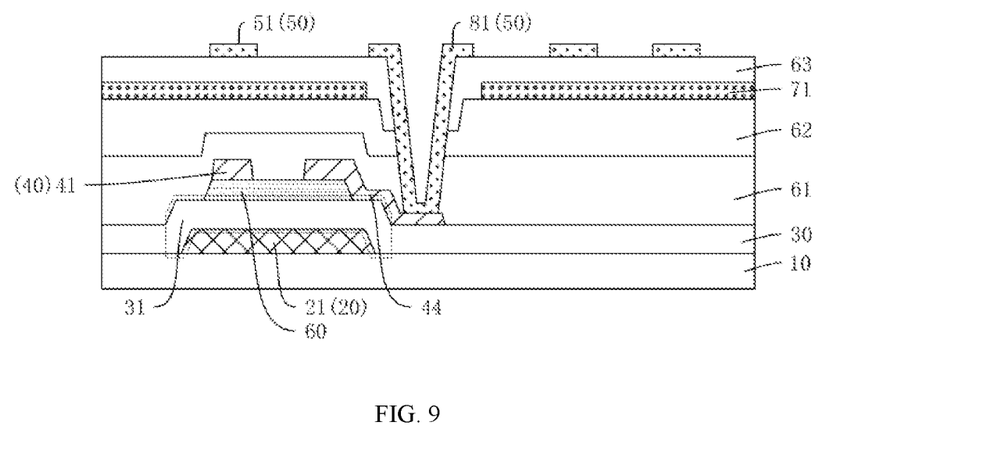
FIG. 9 is a schematic structural diagram of a cross-portion of the display panel taken along the line CC in FIG. 8 in the embodiments of the present application.
Figure 10:
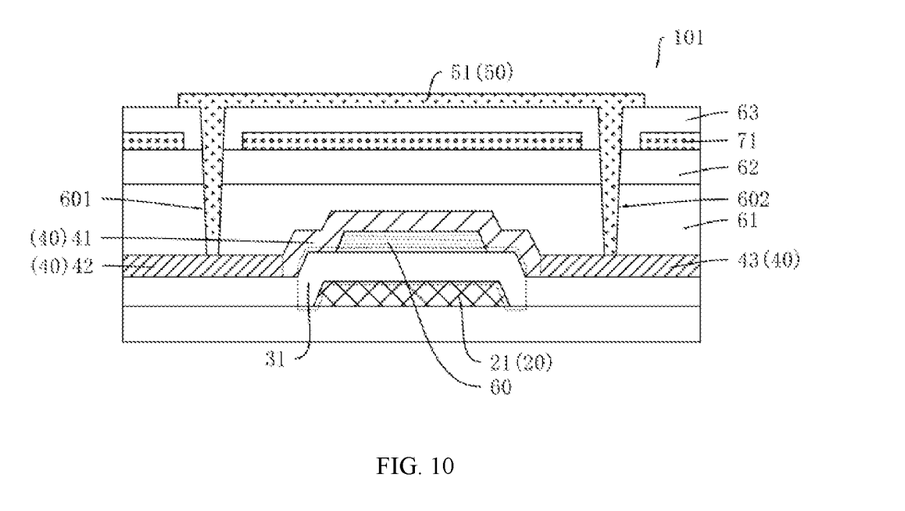
FIG. 10 is a schematic structural diagram of a cross-portion of the display panel taken along the line DD in FIG. 8 in the embodiments of the present application.
Figure 11:
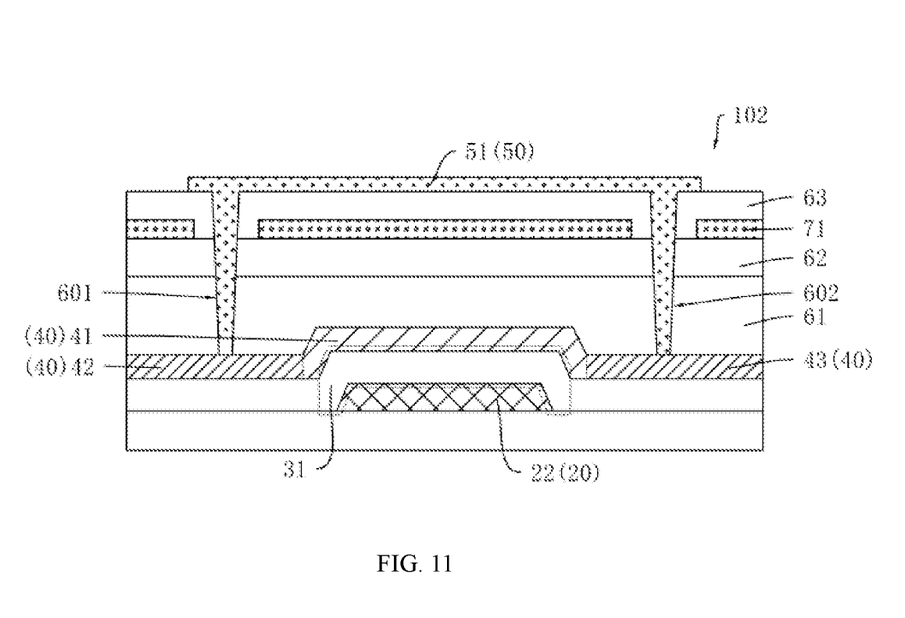
FIG. 11 is a schematic structure diagram of another cross-portional of the display panel in the non-display area in the embodiments of the present application.
Figure 12:
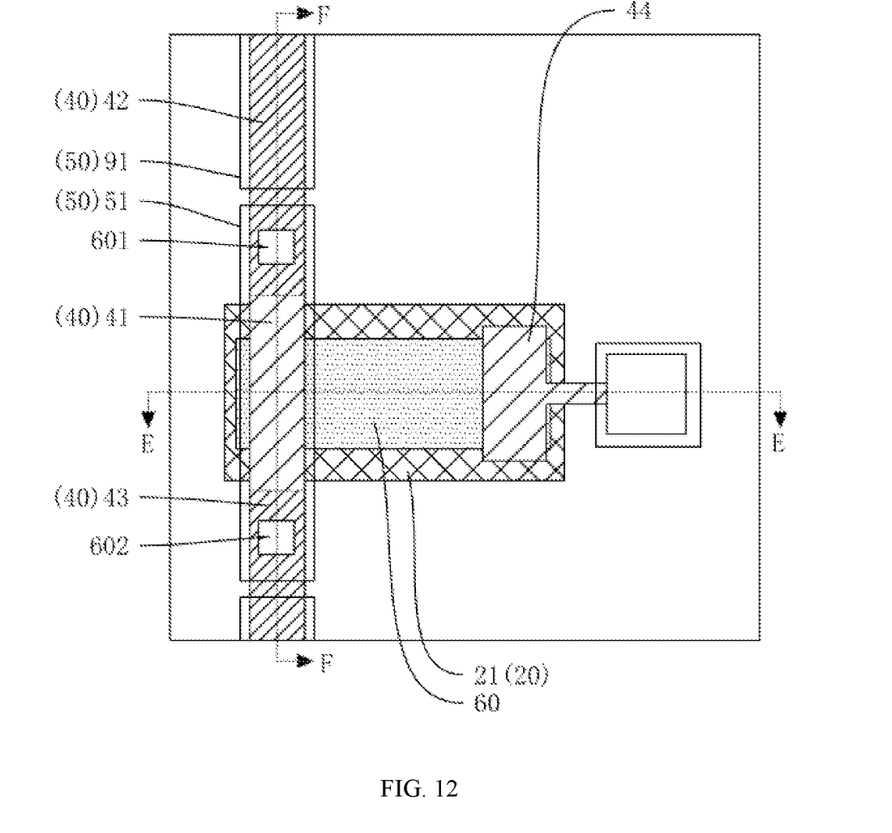
FIG. 12 is a schematic structural diagram of a cross-portion of the display panel taken along the line CC in FIG. 8 in the embodiments of the present application.
Figure 13:
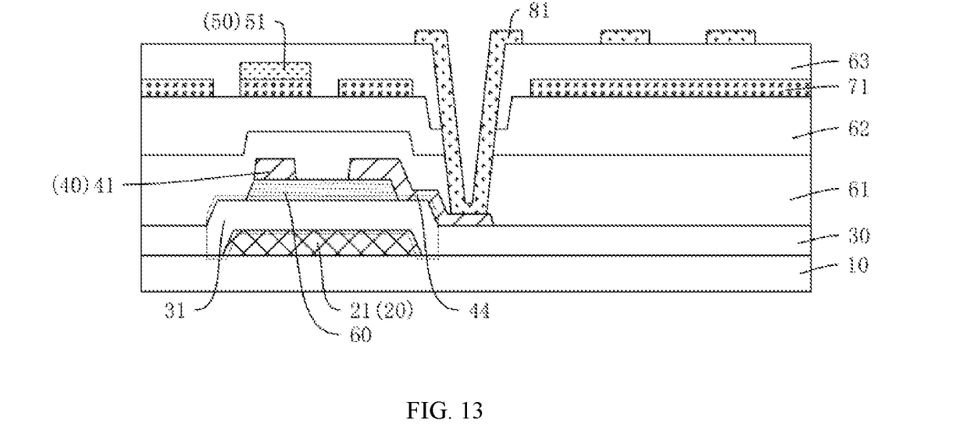
FIG. 13 is a schematic structural diagram of a cross-portion of the display panel taken along the line EE in FIG. 12 in the embodiments of the present application.
Figure 14:
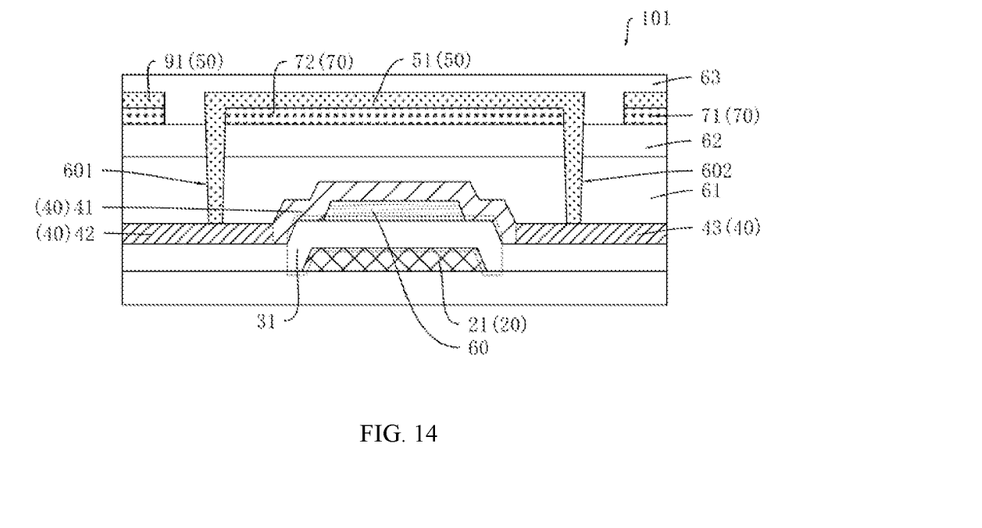
FIG. 14 is a schematic structural diagram of a cross-portion of the display panel taken along the line FF in FIG. 12 in the embodiments of the present application.
Figure 15:
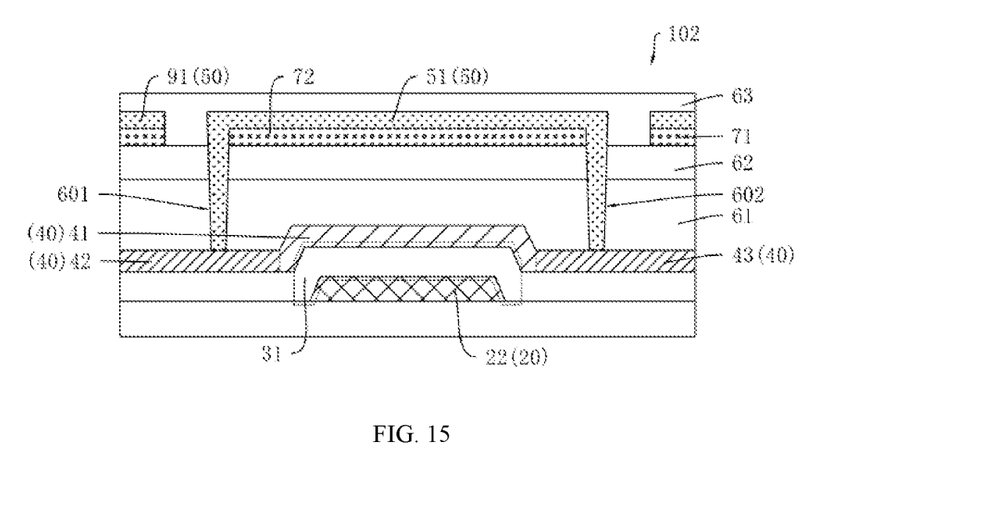
FIG. 15 is a schematic structure diagram of another cross-portional of the display panel in the non-display area in the embodiments of the present application.

In addition, the display panel also includes a non-display area 102 adjacent to the display area 101. The display panel also includes a plurality of wirings disposed in the non-display area 102 for transmitting signals for signal lines or electrode devices in the display area 101. For example, the plurality of wirings may include a first wiring, a second wiring, a third wiring, and a fourth wiring 22.

In detail, please refer to FIG. 7, the first sub-portion 41 can be the first wiring. The second sub-portion 42 can be the second wiring. The third sub-portion 43 can be the third wiring. The first signal transmitting portion 20 can be the fourth wiring 22. The protrusion portion 31 covers the fourth wiring 22, while the first wiring is disposed on a side of the protrusion portion 31 away from the fourth wiring 22. The second wiring and the third wiring are respectively connected to two ends of the first wiring to be integrally formed with the first wiring. An orthographic projection of the second wiring on the substrate 10 and an orthographic projection of the third wiring on the substrate 10 both fall outside the coverage of the orthographic projection of the protrusion portion 31 on the substrate 10. The two ends of the bridging portion 51 are respectively connected to the second wiring and the third wiring, so that the bridging portion 51 is in parallel with the first wiring. This avoids a probability of interrupting the signal transmission of the second wiring and the third wiring due to the disconnection of the first wiring at the side wall of the protrusion portion 31, and improves the yield and the display effect of the display panel.

It should be noted that the first wiring, the second wiring, and the third wiring are connected to each other. The first wiring, the second wiring, and the third wiring can connect with the data line in the display area 101 to transmit signals for every thin-film transistor in the display area 101. The fourth wiring 22 can be a wiring overlapping the first wiring in the non-display area 102 and can be disposed on a same layer with the gate electrode 21.

In the embodiments of the present application, the second signal transmitting portion 40 includes the first sub-portion 41 located on the protrusion portion 31. The second sub-portion 42 and the third sub-portion 43 connected to the two ends of the first sub-portion 41. The second sub-portion 42 and the third sub-portion 43 do not overlap the protrusion portion 31. In the present application, the bridging portion 51 is provided above the second signal transmitting portion 40. The two ends of the bridging portion 51 are electrically connected to the second sub-portion 42 and the third sub-portion 43 respectively. So that the bridging portion 51 and the first sub-portion 41 are connected in parallel. Therefore, even when the first sub-portion 41 breaks at the side wall of the protrusion portion 31, the signal can also be transmitted through the bridging portion 51 without interrupting the signal transmission, and a yield and stability of the display panel can be improved. In addition, the present application provides the bridging portion 51 in parallel with the second signal transmitting portion 40. This can reduce a resistance value of the second signal transmitting portion 40, improve current transmission efficiency of the second signal transmitting portion 40, and improve display effect of the display panel. In addition, in the embodiments of the present application, the bridging portion 51 can be prepared on a same layer as the common electrode 71. So that a disconnection of the second signal transmitting portion 40 in the display panel can be improved without a need for additional processes such as masks, a yield of the display panel can be improved.

In another embodiment of the present application, please refer to FIG. 8, FIG. 9, FIG. 10, and FIG. 11. A difference between this embodiment and the previous embodiment is that three interlayer media layers are disposed between the conductive layer 50 and the second metal layer. In detail, the three interlayer media layers includes a first dielectric layer 61, a second dielectric layer 62, and a third dielectric layer 63. The common electrode 71 is sandwiched between the second dielectric layer 62 and the third dielectric layer 63. In addition, the conductive layer 50 is disposed on a side of the third dielectric layer 63 away from the common electrode 71. The conductive layer 50 includes a bridging portion 51 and a pixel electrode 81.

It should be noted that in other embodiments of the present application, the common electrode 71 can also be disposed between any two of the first dielectric layer 61, the second dielectric layer 62, and the third dielectric layer 63. A quantity of the interlayer dielectric layers is not limited to three, but can also be two, four, five, or more.

In this embodiment, the bridging portion 51 is connected to the second sub-portion 42 through the first contact hole 601. The bridging portion 51 is connected to the third sub-portion 43 through the second contact hole 602. The first contact hole 601 and the second contact hole 602 both go through the first dielectric layer 61, the second dielectric layer 62, and the third dielectric layer 63. At a same time, the first contact hole 601 and the second contact hole 602 also go through a film where the common electrode 71 is located. However, the bridging portion 51 is spaced from the common electrode 71 at the first contact hole 601 and the second contact hole 602. That is, the common electrode 71 is not exposed to the inner walls of the first contact hole 601 and the second contact hole 602.

In the embodiments of the present application, the second signal transmitting portion 40 includes the first sub-portion 41 located on the protrusion portion 31. The second sub-portion 42 and the third sub-portion 43 connected to the two ends of the first sub-portion 41. The second sub-portion 42 and the third sub-portion 43 do not overlap the protrusion portion 31. in the present application, the bridging portion 51 is provided above the second signal transmitting portion 40. The two ends of the bridging portion 51 are electrically connected to the second sub-portion 42 and the third sub-portion 43 respectively. So that the bridging portion 51 and the first sub-portion 41 are connected in parallel. Therefore, even when the first sub-portion 41 breaks at a side wall of the protrusion portion 31, the signal can also be transmitted through the bridging portion 51 without interrupting the signal transmission and the yield and stability of the display panel can be improved. In addition, the present application provides the bridging portion 51 in parallel with the second signal transmitting portion 40. This can reduce a resistance value of the second signal transmitting portion 40, improve current transmission efficiency of the second signal transmitting portion 40, and improve display effect of the display panel. In addition, in the embodiments of the present application, the bridging portion 51 can be prepared on the same layer as the common electrode 71. So that a disconnection of the second signal transmitting portion 40 in the display panel can be improved without a need for additional processes such as masks, the yield of the display panel can be improved.

In another embodiment of the present application, please refer to FIG. 12, FIG. 13, FIG. 14, and FIG. 15. A difference between this embodiment and the first embodiment is that a common electrode layer 70 is disposed between the conductive layer 50 and the second dielectric layer 62. The conductive layer 50 is disposed between the common electrode layer 70 and the third dielectric layer 63. The pixel electrode 81 is disposed on a side of the third dielectric layer 63 away from the conductive layer 50.

The conductive layer 50 includes an auxiliary electrode 91 spaced from the bridging portion 51. The common electrode layer 70 includes a spacer electrode 72 and a common electrode 71. The spacer electrode 72 is disposed between the bridging portion 51 and the second dielectric layer 62. The common electrode 71 is disposed between the auxiliary electrode 91 and the second dielectric layer 62. The common electrode 71 is spaced from the spacer electrode 72.

In this embodiment, the auxiliary electrode 91 is disposed on a side of the common electrode 71 away from the second dielectric layer 62. The auxiliary electrode 91 can be electrically connected to the common electrode 71. So that the common electrode 71 can be connected in parallel with the auxiliary electrode 91. Optional, a material of the auxiliary electrode 91 may be copper. This can effectively reduce a resistance value of the common electrode 71. Because the common electrode 71 is generally disposed on a whole surface, it is easy to generate voltage drop. In this embodiment, the auxiliary electrode 91 is disposed to reduce the resistance value of the common electrode 71, thereby improving the voltage drop of the common electrode 71, improving the homogeneity of the electric field formed by the common electrode 71 and the pixel electrode 81, and improve the display effect of the display panel.

Furthermore, the display panel also includes a plurality of second signal transmitting portions 40. It can be understood that each of the second signal transmitting portions 40 is composed of an integrally formed the source electrode and the data line. The plurality of second signal transmitting portions 40 can be disposed according to arrangement of the data lines in the display area 101. That is, the plurality of second signal transmitting portions 40 can be extended in the first direction and arranged in the second direction. The first direction intersects the second direction, and the first direction and the second direction can be mutually perpendicular.

In this embodiment, the display panel includes a plurality of auxiliary electrodes 91. Arrangement of the plurality of auxiliary electrodes 91 can be a same as arrangement of the plurality of second signal transmitting portions 40. That is, the plurality of auxiliary electrodes 91 extend in the first direction and are arranged in the second direction. The plurality of auxiliary electrodes 91 and the plurality of second signal transmitting portions 40 are arranged in one-to-one correspondence, that is, each of the auxiliary electrodes 91 is correspondingly arranged on a side of one of the second signal transmitting portions 40 away from the first metal layer.

It should be noted that an orthographic projection area of the auxiliary electrode 91 on the substrate 10 can be greater than an orthographic projection area of the second signal transmitting portion 40 on the substrate 10. Or the orthographic projection area of the auxiliary electrode 91 on the substrate 10 can be equal to the orthographic projection area of the second signal transmitting portion 40 on the substrate 10. Or the orthographic projection area of the auxiliary electrode 91 on the substrate 10 can be less than the orthographic projection area of the second signal transmitting portion 40 on the substrate 10.

In the embodiments of the present application, the second signal transmitting portion 40 includes the first sub-portion 41 located on the protrusion portion 31. The second sub-portion 42 and the third sub-portion 43 connected to the two ends of the first sub-portion 41. The second sub-portion 42 and the third sub-portion 43 do not overlap the protrusion portion 31. In the present application, the bridging portion 51 is provided above the second signal transmitting portion 40. The two ends of the bridging portion 51 are electrically connected to the second sub-portion 42 and the third sub-portion 43 respectively. So that the bridging portion 51 and the first sub-portion 41 are connected in parallel. Therefore, even when the first sub-portion 41 breaks at a side wall of the protrusion portion 31, the signal can also be transmitted through the bridging portion 51 without interrupting the signal transmission and a yield and stability of the display panel can be improved. In addition, the present application provides the bridging portion 51 in parallel with the second signal transmitting portion 40. This can reduce a resistance value of the second signal transmitting portion 40, improve current transmission efficiency of the second signal transmitting portion 40, and improve display effect of the display panel. In addition, the embodiments of the present application also improves voltage drop of the common electrode 71 and homogeneity of the electric field generated by the common electrode 71 and the pixel electrode 81 by providing an auxiliary electrode 91 in parallel with the common electrode 71 in the conductive layer 50.

According to the above purpose of the present application, the embodiments of the present application also provides a display device, the display device includes the display panel described in the above embodiments and a device body, and the display panel and the device body are combined as a whole.

The device body may include a middle frame, a sealant, etc. The display device may be a mobile phone, a tablet, a TV and other display terminals, which are not limited here.

In the above embodiments, the description of each embodiment has its own emphasis. For the part not detailed in one embodiment, please refer to the relevant description of other embodiments.

The display panel and the display device provided by the present application are described in detail above. Specific examples are used in this application to explain the principles and implementations of the present application. The description of the above embodiments is only used to help understand the method and core ideas of the application. At the same time, for those of ordinary skill in the art, according to the ideas of this application, there will be changes in the specific implementation and scope of application. In summary, the content of this specification should not be construed as a reference limits.

What is claimed is:

1. A display panel comprising a substrate, a thin-film transistor disposed on the substrate, and a data line electrically connected to the thin-film transistor, wherein the thin-film transistor comprises a gate electrode, an active portion, and a source electrode and a drain electrode lap-jointed with the active portion, wherein the display panel further comprises:

a first metal layer disposed on the substrate and comprising at least one first signal transmitting portion, wherein the first signal transmitting portion comprises the gate electrode;

an insulating layer covering the substrate and the first metal layer and comprising a protrusion portion covering the first signal transmitting portion;

a second metal layer disposed on a surface of the insulating layer away from the first metal layer, wherein the second metal layer comprises at least one second signal transmitting portion, the second signal transmitting portion comprises a first sub-portion disposed on a side of the protrusion portion away from the first signal transmitting portion, a second sub-portion, and a third sub-portion, wherein the second sub-portion and the third sub-portion are respectively connected to two ends of the first sub-portion; wherein the first sub-portion comprises the source electrode, the data line comprises the second sub-portion and the third sub-portion, the source electrode is located on a side of the protrusion portion away from the gate electrode, the data line is connected to two ends of the source electrode, and both of the data line and the source electrode extend along a first direction;

a conductive layer disposed on a side of the second metal layer away from the insulating layer and comprising a bridging portion disposed on a side of the second signal transmitting portion away from the first signal transmitting portion;

at least one interlayer dielectric layer disposed between the second metal layer and the conductive layer; wherein a first contact hole and a second contact hole are defined through the at least one interlayer dielectric layer, the bridging portion connects with the second sub-portion through the first contact hole, and the bridging portion connects with the third sub-portion through the second contact hole; and wherein an orthographic projection of the first contact hole on the substrate and an orthographic projection of the second contact hole on the substrate both fall outside the coverage of the orthographic projection of the protrusion portion on the substrate; and a common electrode layer disposed on a side of the at least one interlayer dielectric layer away from the second metal layer; wherein the conductive layer is disposed on a side of the common electrode layer away from the at least one interlayer dielectric layer, and wherein the conductive layer further comprises at least one auxiliary electrode spaced from the bridging portion, the common electrode layer comprises a spacer electrode disposed between the bridging portion and the at least one interlayer dielectric layer and a common electrode disposed between the auxiliary electrode and the at least one interlayer dielectric layer, and the spacer electrode is spaced from the common electrode;

wherein an orthographic projection of the second sub-portion on the substrate and an orthographic projection of the third sub-portion on the substrate both fall outside a coverage of an orthographic projection of the protrusion portion on the substrate, and two ends of the bridging portion are electrically connected to the second sub-portion and the third sub-portion respectively; an orthographic projection of the data line on the substrate falls outside the coverage of the orthographic projection of the protrusion portion on the substrate, and the two ends of the bridging portion are both electrically connected to the data line.

2. The display panel according to claim 1, wherein the display panel further comprises a first wire, a second wire, a third wire, and a fourth wire disposed in a non-display area of the display panel; and the first signal transmitting portion comprises the fourth wire, the first sub-portion comprises the first wire, the second sub-portion comprises the second wire, the third sub-portion comprises the third wire, the first wire is located on a side of the protrusion portion away from the fourth wire, the second wire and the third wire are connected to two ends of the first wire respectively, and the two ends of the bridging portion are connected to the second wire and the third wire respectively.

3. The display panel according to claim 1, wherein the display panel further comprises a pixel electrode disposed on a side of the conductive layer away from the at least one interlayer dielectric layer, and the common electrode is spaced from the bridging portion.

4. The display panel according to claim 1,
wherein the conductive layer further comprises a pixel electrode, and the pixel electrode is spaced from the bridging portion.

5. The display panel according to claim 4, wherein the first contact hole and the second contact hole both go through the at least two interlayer dielectric layers, and the common electrode is spaced from the bridging portion at the first contact hole and the second contact hole.

6. The display panel according to claim 1, wherein the at least one interlayer dielectric layer comprises a first dielectric layer covering the second metal layer and a second dielectric layer disposed at a side of the first dielectric layer away from the second metal layer, a material of the first dielectric layer is inorganic insulating material, and a material of the second dielectric layer is organic insulating material.

7. The display panel of claim 1, wherein the conductive layer comprises a plurality of auxiliary electrodes, the plurality of auxiliary electrodes extend along a first direction and are arranged on a side of the common electrode away from the at least one interlayer dielectric layer along a second direction, the plurality of auxiliary electrodes are electrically connected to the common electrode, and the first direction is different from the second direction.

8. The display panel of claim 7, wherein the second metal layer comprises a plurality of second signal transmitting portions, the plurality of second signal transmitting portions extend along the first direction and are arranged on a side of the insulating layer away from the first metal layer along the second direction, and each of the auxiliary electrodes is correspondingly disposed on a side of one of the plurality of second signal transmitting portions away from the first metal layer.

9. A display device, comprising a display panel and a device body, the display panel comprising a substrate, a thin-film transistor disposed on the substrate, and a data line electrically connected to the thin-film transistor, wherein the thin-film transistor comprises a gate electrode, an active portion, and a source electrode and a drain electrode lap-jointed with the active portion, wherein the display panel further comprises:
a first metal layer disposed on the substrate and comprising at least one first signal transmitting portion, wherein the first signal transmitting portion comprises the gate electrode;
an insulating layer covering the substrate and the first metal layer and comprising a protrusion portion covering the first signal transmitting portion;
a second metal layer disposed on a surface of the insulating layer away from the first metal layer, wherein the second metal layer comprises at least one second signal transmitting portion, the second signal transmitting portion comprises a first sub-portion disposed on a side of the protrusion portion away from the first signal transmitting portion, a second sub-portion, and a third sub-portion, wherein the second sub-portion and the third sub-portion are respectively connected to two ends of the first sub-portion; wherein the first sub-portion comprises the source electrode, the data line comprises the second sub-portion and the third sub-portion, the source electrode is located on a side of the protrusion portion away from the gate electrode, the data line is connected to two ends of the source electrode, and both of the data line and the source electrode extend along a first direction;
a conductive layer disposed on a side of the second metal layer away from the insulating layer and comprising a bridging portion disposed on a side of the second signal transmitting portion away from the first signal transmitting portion;
at least one interlayer dielectric layer disposed between the second metal layer and the conductive layer; wherein a first contact hole and a second contact hole are defined through the at least one interlayer dielectric layer, the bridging portion connects with the second sub-portion through the first contact hole, and the bridging portion connects with the third sub-portion through the second contact hole; and wherein an orthographic projection of the first contact hole on the substrate and an orthographic projection of the second contact hole on the substrate both fall outside the coverage of the orthographic projection of the protrusion portion on the substrate; and
a common electrode layer disposed on a side of the at least one interlayer dielectric layer away from the second metal layer; wherein the conductive layer is disposed on a side of the common electrode layer away from the at least one interlayer dielectric layer, and wherein the conductive layer further comprises at least one auxiliary electrode spaced from the bridging portion, the common electrode layer comprises a spacer electrode disposed between the bridging portion and the at least one interlayer dielectric layer and a common electrode disposed between the auxiliary electrode and the at least one interlayer dielectric layer, and the spacer electrode is spaced from the common electrode;
wherein an orthographic projection of the second sub-portion on the substrate and an orthographic projection of the third sub-portion on the substrate both fall outside a coverage of an orthographic projection of the protrusion portion on the substrate, and two ends of the bridging portion are electrically connected to the second sub-portion and the third sub-portion respectively; an orthographic projection of the data line on the substrate falls outside the coverage of the orthographic projection of the protrusion portion on the substrate, and the two ends of the bridging portion are both electrically connected to the data line.

10. The display device according to claim 9, wherein the display panel further comprises a pixel electrode disposed on a side of the conductive layer away from the at least one interlayer dielectric layer, and the common electrode is spaced from the bridging portion.

11. The display device according to claim 9,
wherein the conductive layer further comprises a pixel electrode, and the pixel electrode is spaced from the bridging portion.

12. The display device according to claim 11, wherein the first contact hole and the second contact hole both go through the at least two interlayer dielectric layers, and the common electrode is spaced from the bridging portion at the first contact hole and the second contact hole.

13. The display device of claim 9, wherein the conductive layer comprises a plurality of auxiliary electrodes, the plurality of auxiliary electrodes extend along a first direction and are arranged on a side of the common electrode away from the at least one interlayer dielectric layer along a second direction, the plurality of auxiliary electrodes are electrically connected to the common electrode, and the first direction is different from the second direction.

14. The display device of claim 13, wherein the second metal layer comprises a plurality of second signal transmitting portions, the plurality of second signal transmitting portions extend along the first direction and are arranged on a side of the insulating layer away from the first metal layer along the second direction, and each of the auxiliary electrodes is correspondingly disposed on a side of one of the plurality of second signal transmitting portions away from the first metal layer.

* * * * *